May 27, 1924.
H. S. KNIGHT
THERMOSTATIC ADJUSTMENT FOR SCALE CHARTS
Filed Oct. 6, 1922
1,495,331
3 Sheets-Sheet 1
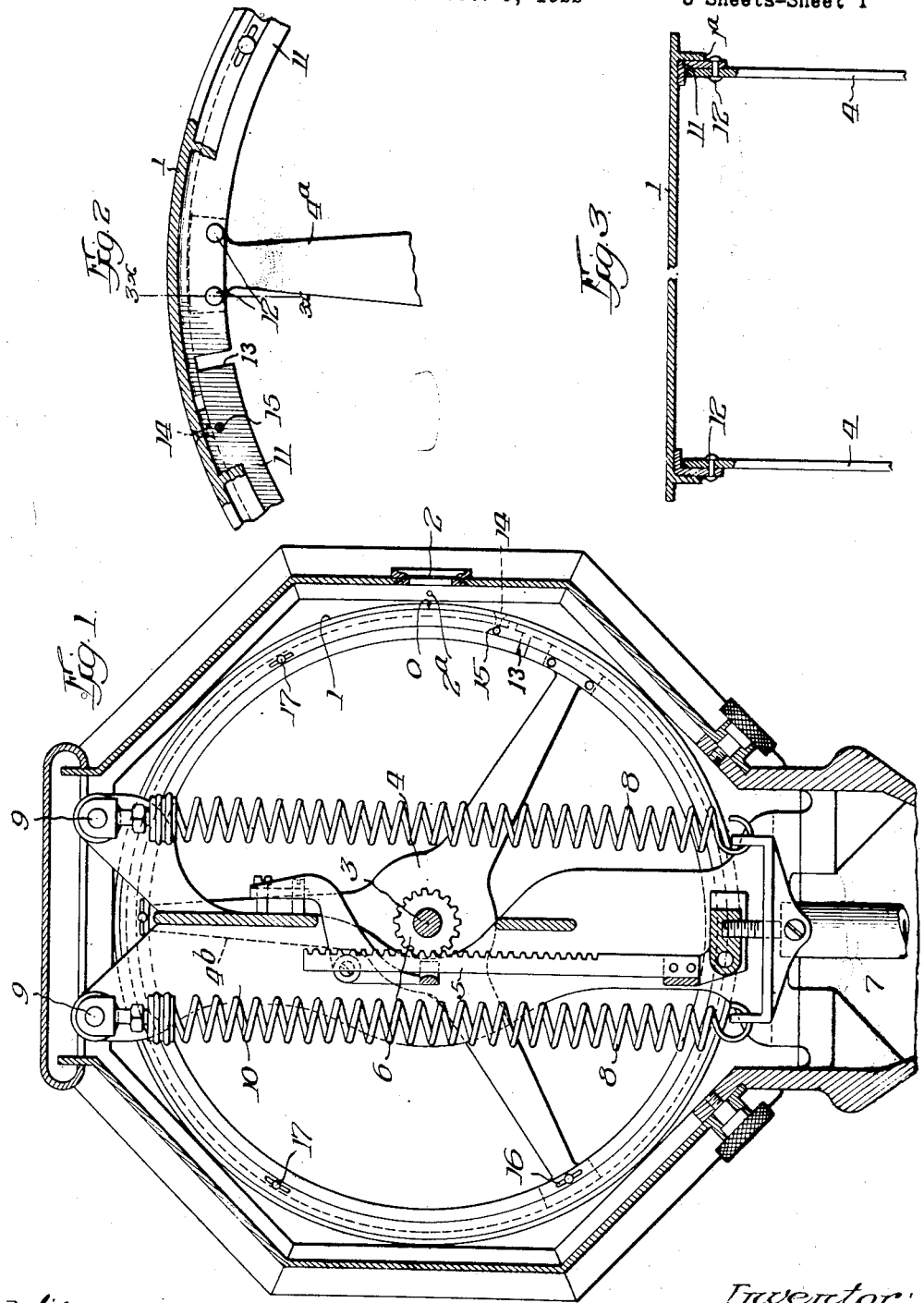

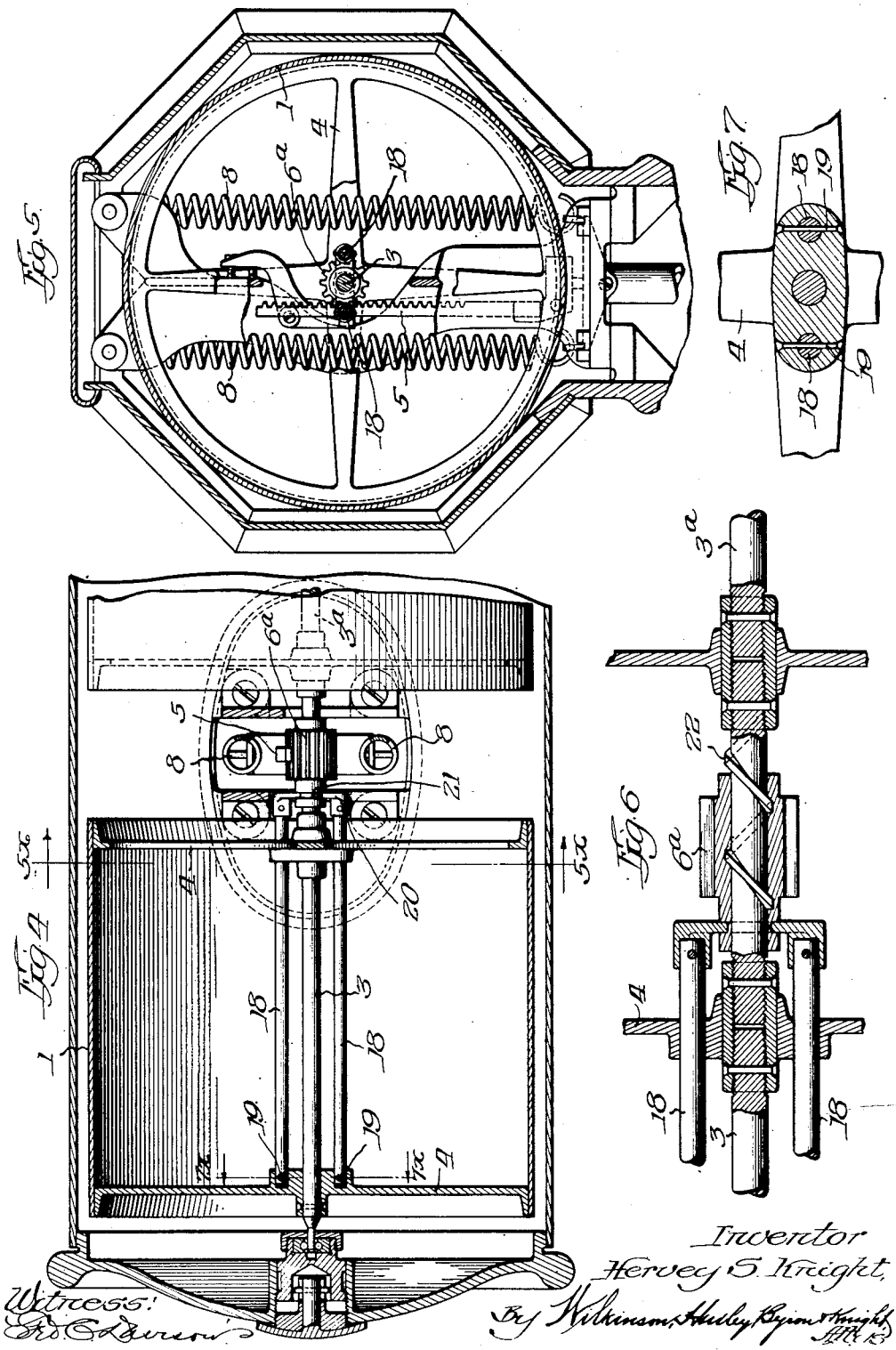

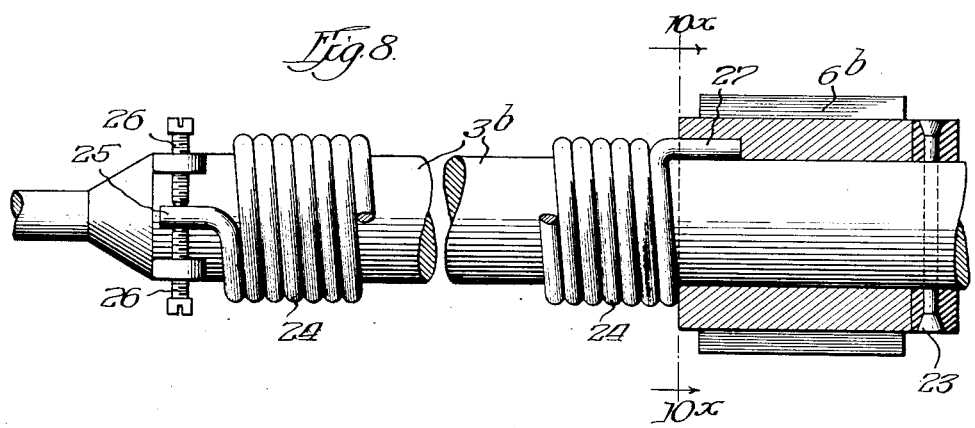
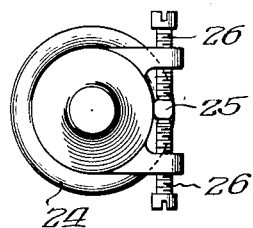
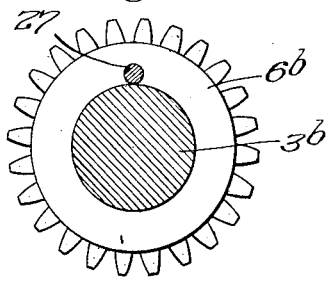
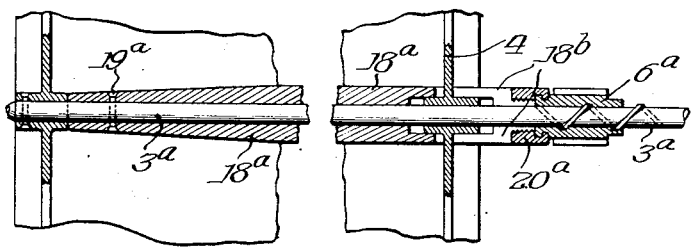

Patented May 27, 1924.

1,495,331

UNITED STATES PATENT OFFICE.

HERVEY S. KNIGHT, OF EVANSTON, ILLINOIS, ASSIGNOR TO SANITARY SCALE COMPANY, OF CHICAGO, ILLINOIS, A CORPORATION OF ILLINOIS.

THERMOSTATIC ADJUSTMENT FOR SCALE CHARTS.

Application filed October 6, 1922. Serial No. 592,780.

*To all whom it may concern:*

Be it known that I, HERVEY S. KNIGHT, a citizen of the United States, residing at Evanston, in the county of Cook and State of Illinois, have invented certain new and useful Improvements in Thermostatic Adjustments for Scale Charts, of which the following is a specification.

This invention relates to spring balanced weighing scales, and particularly to means combined with such a scale for automatically adjusting the chart or indicator thermostatically with changes in temperature in order to maintain constant zero notwithstanding changes from such cause which develop in the length of the counterbalancing springs.

The primary object of the invention is to provide a thermostatic adjustment between the indicator and a part or parts through which it is driven or upon which it is mounted, as distinguished from thermostatic devices for changing the support of the spring or effecting changes in the steelyard rod or other transmitting connections. Accordingly, one feature of the invention consists in providing a movable mounting for the indicator, either between the indicator and its immediate support or between such support and the translating or driving connection therefor, and a thermostatic member which develops movement in this mounting in directions opposite to those in which the indicator is moved by expansion and contraction of the counterbalancing springs.

Another object of the invention is to provide a construction in which the driving pinion through which the indicator is moved is automatically shifted by thermostatic means circumferentially with relation to the shaft upon which it is mounted. Accordingly, another feature of the invention consists in mounting the pinion upon the shaft with freedom of movement and introducing a thermostatic member between the pinion and a fixed abutment so that when the thermostatic member expands or contacts the pinion will be moved as described; the thermostatic member being of a form which imparts axial movement to the pinion on the shaft, which movement is translated into circumferential movement by means of a spiral key between the pinion and shaft; or the thermostatic member is of a kind, for instance, a helix wound about the shaft, which develops circumferential movement at its free end, by expansion and contraction under changes in temperature, and imparts this circumferential movement directly to the pinion.

In the accompanying drawings, in which two embodiments of the invention are shown by way of illustration—

Figure 1 is a transverse section through the chart housing of a spring balanced scale showing counterbalancing springs and driving or translating connections in elevation, and a thermostatic mounting between the cylindrical shell of the chart and the spider upon which it is mounted, in section.

Figure 2 is a fragmentary view of a part of Figure 1 on an enlarged scale.

Figure 3 is a section on the line $3^x$—$3^x$ of Figures 1 and 2.

Figure 4 is a horizontal section through a portion of the chart housing with the counterbalancing springs and chart driving connections in section, and thermostatic pinion adjusting means in top plan view.

Figure 5 is a vertical transverse section on the line $5^x$—$5^x$ of Figure 4.

Figure 6 is a sectional detail view of means for developing circumferential movement between the driving pinion and the chart shaft by thermostatic movement in the direction of the axis of the shaft.

Figure 7 is a section on the line $7^x$—$7^x$ of Figure 4.

Figure 8 is a detail view showing a means for transmitting drive from the pinion to the shaft of the chart by a thermostatic member which acts circumferentially to change the relative positions of said parts.

Figure 9 is an end elevation of a left-hand portion of Figure 8.

Figure 10 is a section on the line $10^x$—$10^x$ of Figure 8; and

Figure 11 is a detail view showing a modified form of thermostatic member operating upon the principle disclosed in Figures 4 to 7.

1 represents the cylindrical wall of the chart upon which the indicia of the scale are applied including the zero which when the scale is at rest occupies the position indicated in Figure 1, where it can be observed through a window 2 in relation to a sighting line $2^a$. 3 represents a shaft upon which the chart is mounted through the medium of spider 4; and 5 represents a rack bar which coacts with the pinion 6 mounted upon the shaft 3 in a manner to translate vertical reciprocating movements of a steelyard rod 7 into rotary movements of the chart as a load transmitted through said steelyard rod overcomes the counterbalancing springs 8 which are supported from fixed points 9 upon a standard 10.

In an arrangement such as described, when the springs 8 are affected by changes in temperature, the zero on the chart moves above or below the sighting line $2^a$. Various thermostatic means have been suggested for automatically maintaining zero at proper position, but these have generally involved complications in the construction of the load transmitting portions of the scale, or means for thermostatically raising and lowering the fixed supports 9 of the counterbalanced springs 8. The present invention accomplishes the desired result by shifting the chart 1 relatively to parts by which it is driven.

According to the construction shown in Figures 1 to 3, the cylindrical chart member 1 is mounted upon the spider 4 through the medium of split rings 11, which are anchored firmly at one end to a spider arm $4^a$, as for instance, by means of rivets 12, and have free ends 13 separated from their anchored ends in a manner to permit the free expansion and contraction of the rings in the direction of the circumference of the chart. And the cylindrical chart 1 is rigidly connected to the rings 11, as for instance, by rivets 14, 15, at points sufficiently remote from the fixed anchorage 12 to cause the chart to partake of movements developed by expansion and contraction of the rings under changes in temperature in a degree that will correspond to the tendency of zero to move away from the sighting line $2^a$ under changes in the length of the springs 8. If the rivets 14, 15 are located near the extreme free ends 13 of the rings 11, obviously the thermostatic adjustment of the chart will correspond to the expansion and contraction of the entire ring; but if the point of fixed attachment between the chart and the rings be nearer to the fixed anchorage 12 of the rings on the spider, the shifting of the chart will obviously be of less amplitude. The rings 11 are suitably connected with spider arms $4^b$ other than the ones to which they are fixedly anchored, but such connections are through the medium of slip joints 16 conveniently made by slot and pin connections so that while the circumferential positions of the rings are assured their expansion and contraction are not restrained. Similarly, the cylindrical chart 1 is connected with the rings 11 at sufficiently frequent intervals to avoid any distortion in the chart, but these intermediate connections are through means of slots and pins as shown at 17, in order to leave the cylindrical chart free to move under thermostatic action.

According to Figures 4 to 11, thermostatic shifting of the chart to maintain zero on the sighting line is effected by relative movement between the pinion $6^a$ and the shaft $3^a$. This may be accomplished in any of several ways. For instance, according to Figures 4 to 7, a pair of thermostatic rods 18 having fixed abutments 19 extend parallel with the shaft $3^a$ to a yoke 20 which embraces the wrist 21 of the pinion $6^a$ in a manner to impart movement to the pinion in the direction of the axis of the shaft $3^a$ as the thermostatic rods expand or contract but without restricting rotary movement of the pinion. Pinion $6^a$ is fitted to the shaft $3^a$ through the medium of a quick pitch thread or key 22 so that an axial movement of the pinion on the shaft is accompanied by a relative circumferential movement between the pinion and the shaft, with the result that as the pinion is rotated by the rise or fall of the rack bar 5 resulting from changes in the length of the springs 8, the shaft $3^a$ will be shifted in the pinion in the opposite direction sufficiently to keep zero on the sighting line. The pinion $6^a$ is made of sufficient axial dimension to admit of movement in said direction relatively to the rack bar 5 without removing the coacting teeth of the pinion from engagement with the teeth of the rack bar.

According to Figure 8, the shaft $3^b$ has fitted upon it a pinion $6^b$ which is free to rotate without axial movement, being preferably confined by means of a shoulder 23. A thermostatic member 24 in the form of a helix surrounding the shaft $3^b$ has one end 25 anchored between adjusting screws 26 and its other end 27 free and in engagement with the pinion $6^b$ in a manner to develop rotation of the pinion on the shaft with changes in the length of the rod constituting the helix, resulting from variations in temperature. By means of screws 26 the helix can be bodily revolved upon the shaft $3^b$ in order to zeroize the chart in originally setting up the scale.

As shown in Figure 11, the pinion $6^a$ is threaded upon the shaft $3^a$ as in Figure 6, so as to be controlled by thermostat $18^a$ acting in all respects like the thermostatic bars 18. But said thermostatic member is anchored at fixed abutment $19^a$, engages the pinion through means of a wrist sleeve $20^e$ corresponding to the yoke 20, and is in the form of a sleeve surrounding the shaft $3^a$ and extending continuously from the fixed abutment to the pinion; slots $18^b$ being provided where necessary to admit the spider arms 4.

I claim:

1. In a spring-balance scale having a chart and means for imparting weighing movements to said chart, a thermostatically controlled connection between the chart and said means adapted to shift the chart relatively to said means commensurately with changes in the position of said means resulting from thermostatic changes in the spring counterbalance.

2. In a scale, a chart, means for transmitting movements to said chart commensurate with weighing movements of the scale, a spring balance acting on said means in opposition to the load to be weighed, a connection between said means and the chart which permits changes in their normal relative positions, and a thermostat controlling said connection.

3. In a spring-balance scale, a chart for registering weighing movement, a support for said chart upon which the chart is relatively movable in the direction of its registering movements, and thermostatic means for developing such relative movements between the chart and its support.

4. In a spring-balance scale, a chart, a support for said chart receiving and transmitting thereto weighing movements, and a thermostatic member connecting said chart to said support.

5. In a spring-balance scale, a cylindrical chart, a shaft upon which said chart is mounted, a pinion through which said shaft is revolved, and thermostatic means for varying the position of the chart relatively to the pinion in the direction of rotation.

6. In a spring-balance scale, a rotary chart comprising a cylindrical member carrying weighing indicia, a support for said cylindrical member, and a split ring of material having a substantial coefficient of expansion and contraction under changes in temperature, interposed between said support and said cylindrical member; said ring having fixed connections with said support and said cylindrical member at points remote from each other in the direction of the circumference of the ring.

7. In a spring-balance scale, a rotary chart comprising a cylindrical member carrying weighing indicia, a support for said cylindrical member, and a split ring of material having a substantial coefficient of expansion and contraction under changes in temperature, interposed between said support and said cylindrical member; said ring having fixed connections with said support and said cylindrical member at points remote from each other in the direction of the circumference of the ring, and having at intermediate points between said fixed connections, connections with said cylindrical member which permit relative circumferential movement between them.

Signed at Chicago, Illinois, this 28th day of September, 1922.

HERVEY S. KNIGHT.